United States Patent
Hamaguchi

(10) Patent No.: US 9,063,678 B2
(45) Date of Patent: Jun. 23, 2015

(54) IMAGE FORMING APPARATUS AND METHOD FOR THE SAME

(75) Inventor: Jun Hamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 13/447,653

(22) Filed: Apr. 16, 2012

(65) Prior Publication Data

US 2012/0268782 A1   Oct. 25, 2012

(30) Foreign Application Priority Data

Apr. 21, 2011   (JP) ................................. 2011-095179

(51) Int. Cl.
*G06F 3/12*   (2006.01)
*G06K 15/02*   (2006.01)

(52) U.S. Cl.
CPC .......... *G06F 3/1205* (2013.01); *G06K 15/1805* (2013.01); *G06F 3/1204* (2013.01); *G06F 3/123* (2013.01); *G06F 3/1231* (2013.01); *G06F 3/1279* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 2007/0263235 A1* | 11/2007 | Oomura et al. | 358/1.4 |
| 2008/0212137 A1* | 9/2008 | Iwata et al. | 358/1.16 |
| 2009/0086269 A1* | 4/2009 | Nakajima | 358/1.15 |
| 2009/0213407 A1* | 8/2009 | Kamiya | 358/1.13 |
| 2010/0058123 A1* | 3/2010 | Yamashirodani et al. | 714/57 |
| 2010/0214588 A1* | 8/2010 | Nakahara | 358/1.13 |

FOREIGN PATENT DOCUMENTS

| | | | |
|---|---|---|---|
| JP | 2005-094057 A | 4/2005 |
| JP | 2006-033342 A | 2/2006 |
| JP | 2008-027127 A | 2/2008 |
| JP | 2008-238799 A | 10/2008 |
| JP | 2010-219962 A | 9/2010 |

\* cited by examiner

*Primary Examiner* — Vincent Rudolph
*Assistant Examiner* — Richa Mishra
(74) *Attorney, Agent, or Firm* — Canon USA Inc. IP Division

(57) ABSTRACT

An image forming apparatus stores setting information received from an external device in a temporary region, and compares device identification information acquired from the setting information with device identification information of the image forming apparatus. The image forming apparatus determines a reflection level used to reflect each setting included in the setting information stored in the temporary region, and stores the setting information in a database. Further, the image forming apparatus extracts a setting compliant with the reflection level and a reflection policy, using a plurality of import modules, and stores the extracted setting in a database that is actually used for control performed by the image forming apparatus.

7 Claims, 9 Drawing Sheets

```
device_settings ─┬─ address_book_settings ─┐
                 ├─ department_id_settings ─┐
                 ├─ common_setup ─┬─ init_screen_setup = 0
                 │                ├─ mmi_aclr_return = 0
                 │                ├─ mmi_beep_onoff = 7
                 │                ├─ inch_size_input = 1
                 │                ├─ print_setup ─┬─ cassette_sel = 0
```

362

```xml
<?xml version = "1.0" encoding = "utf-8" ?>
<device_settings>
  <address_book_settings>
  </address_book_settings>
  <department_id_settings>
    :
  </department_id_settings>
  <common_setup>
    <init_screen_setup>1</init_screen_setup>
    <mmi_aclr_return>0</mmi_aclr_return>
    <mmi_beep_onoff>0</mmi_beep_onoff>
    <mmi_scrn_svr_onoff>0</mmi_scrn_svr_onoff>
    <inch_size_input>1</inch_size_input>
    <printer_setup>
      <cassette_sel>0</cassette_sel>   366
    :
  </common_setup>
</device_settings>
```

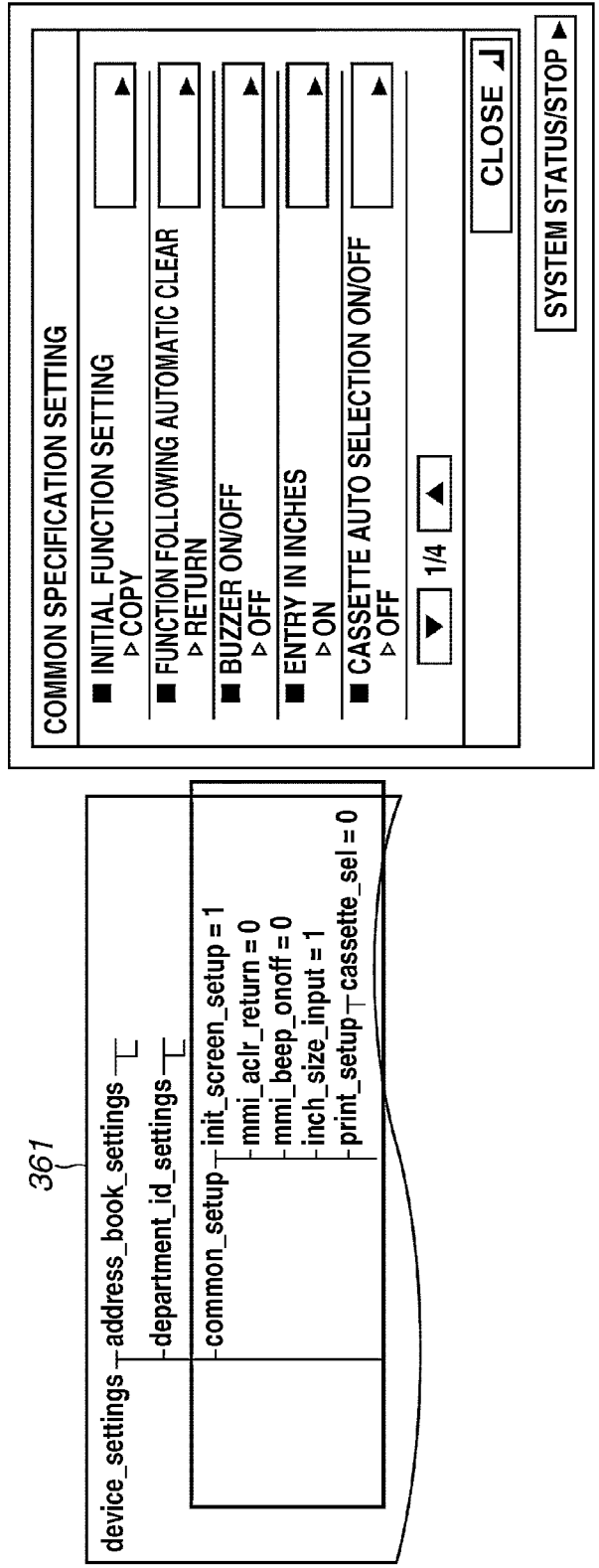

IMAGE FORMING APPARATUS AND METHOD FOR THE SAME

BACKGROUND OF THE INVENTION

1. Field of the Invention

The present invention relates to a technique capable of managing setting information of an image forming apparatus, such as a printing apparatus, a copying machine, or a multi-function peripheral having multiple functions.

2. Description of the Related Art

A recent image forming apparatus has a plurality of functions prepared beforehand, and has the capability of additionally installing various applications. A user of the image forming apparatus can use these functions and applications directly or via a network. The setting information increases in the number of items to be set or adjusted if the total number of the functions increases. Thus, an initial setup of an image forming apparatus for office use takes a significant time.

Hence, prior to the delivery of the apparatus to an office system, a selling agent is required to perform preliminary kitting that includes a work for introducing and setting applications and options according to the system beforehand in a batch manner. More specifically, a worker performs a manual setting work considering setup conditions received beforehand from the delivery destination as well as setting information extracted from an existing device (e.g., a target machine to be replaced) of the delivery destination.

Hence, in a situation that the worker is forced to work concentratedly to deliver a large number of machines during a busy time, it will be difficult to secure a sufficient lead-time for the shipment. Further, even in a case where the adjustment and setting work has been completed before shipment, the delivered machine may not smoothly operate due to ambient conditions (e.g., vibrations during transportation, temperature difference, and humidity difference). In such a case, the worker may be requested to replace the delivered machine by a non-defective one. In this case, it is necessary to perform the setting work again for the delivered image forming apparatus. In such a case, it is desired that the setting values can be quickly reflected in the image forming apparatus.

As a conventional technique, it is feasible for an apparatus to acquire or distribute common setting items from or to another apparatus when the apparatus is connected to a network or a memory medium. For example, according to a management method discussed in Japanese Patent Application Laid-Open No. 2008-238799, setting information common to a plurality of models is discriminated from setting information effective only to a specific model and can be separately output to an external storage device. Further, it is feasible to select effective setting values exclusively from an external storage device and store the acquired setting values in an internal nonvolatile memory.

However, the setting information of a recent image forming apparatus is finely classified into a plurality of categories, such as setting information relating to various control operations to be performed by the apparatus, setting information relating to image processing, setting information relating to installed applications, unique information relating to each device configuration only, and common information relating to initial values of common functions (including an address book) that are common to a plurality of models.

For example, unique setting information that is dependent on a device configuration is applicable to only an image forming apparatus that has the same device configuration. In an image forming apparatus having a different configuration, a setting item having a different format and the value thereof are used in management.

Further, setting information relating to license or security is information unique to each machine body due to operational reasons, and, therefore, cannot be equally used for another image forming apparatus even when the apparatus has the same configuration. As another example, unique setting information dependent on each application can be managed using setting items that have a format variable depending on each vendor that has designed the application.

Further, setting information relating to new functions of a brand-new model or setting information relating to functions relevant to updated specification is initially managed as unique setting information. However, these functions are gradually applied to all models as time goes on. Therefore, unique setting information is no longer new and will be classified into (or regarded as) common setting information as it becomes older.

Hence, according to the technique discussed in Japanese Patent Application Laid-Open No. 2008-238799, an update flag indicating transmission allowance and acceptance allowance is allocated to each setting item to manage the device information and a setting value of the update flag can be managed. In other words, the setting information is managed fixedly for each setting item using the update flag. As described above, the setting information of each image forming apparatus is finely classified into a plurality of categories depending on the use of the information. Therefore, the management method discussed in Japanese Patent Application Laid-Open No. 2008-238799 is insufficient to realize satisfactory management. Further, if the above-described flag indicates that the transmission is disabled, the setting value cannot be transmitted to an external device. In such a case, if the above-described change to the common setting occurs, it is unable to transfer the setting value to another device flexibly.

SUMMARY OF THE INVENTION

The present invention is directed to a management technique capable of classifying setting information of an image forming apparatus appropriately and transferring the setting information to another device flexibly.

According to an aspect of the present invention, an image forming apparatus that performs control according to setting information including apparatus unique settings and common settings commonly usable for a plurality of apparatuses including the image forming apparatus includes a first storing unit configured to store, in a temporary region, setting information, described in Extensible Markup Language (XML), that is received from a connected device, an acquisition unit configured to acquire device identification information from the setting information stored in the temporary region, a second storing unit configured to compare the device identification information acquired by the acquisition unit with device identification information of the image forming apparatus, to determine a reflection level used to reflect each setting included in the setting information stored in the temporary region, and then to store the setting information in a database, and a third storing unit configured to extract a setting to be reflected according to the reflection level from the setting information stored in the database by the second storing unit, using a plurality of import modules prepared for the unique settings and the common settings included in the setting information, and to store the extracted setting in a database that is actually used for control performed by the image forming apparatus, wherein the third storing unit is configured to obtain a value compliant with a reflection policy for the setting extracted according to the reflection level using the plurality of import modules, and to store the obtained value in the database that is actually used for control performed by the image forming apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A and 5B schematically illustrate a configuration of data that can be managed by a tree structure and examples of Extensible Markup Language (XML) data.

FIG. 6 illustrates an example of an operation unit in a case where setting values are imported.

DESCRIPTION OF THE EMBODIMENTS

Various exemplary embodiments, features, and aspects of the invention will be described in detail below with reference to the drawings.

Figure 1:
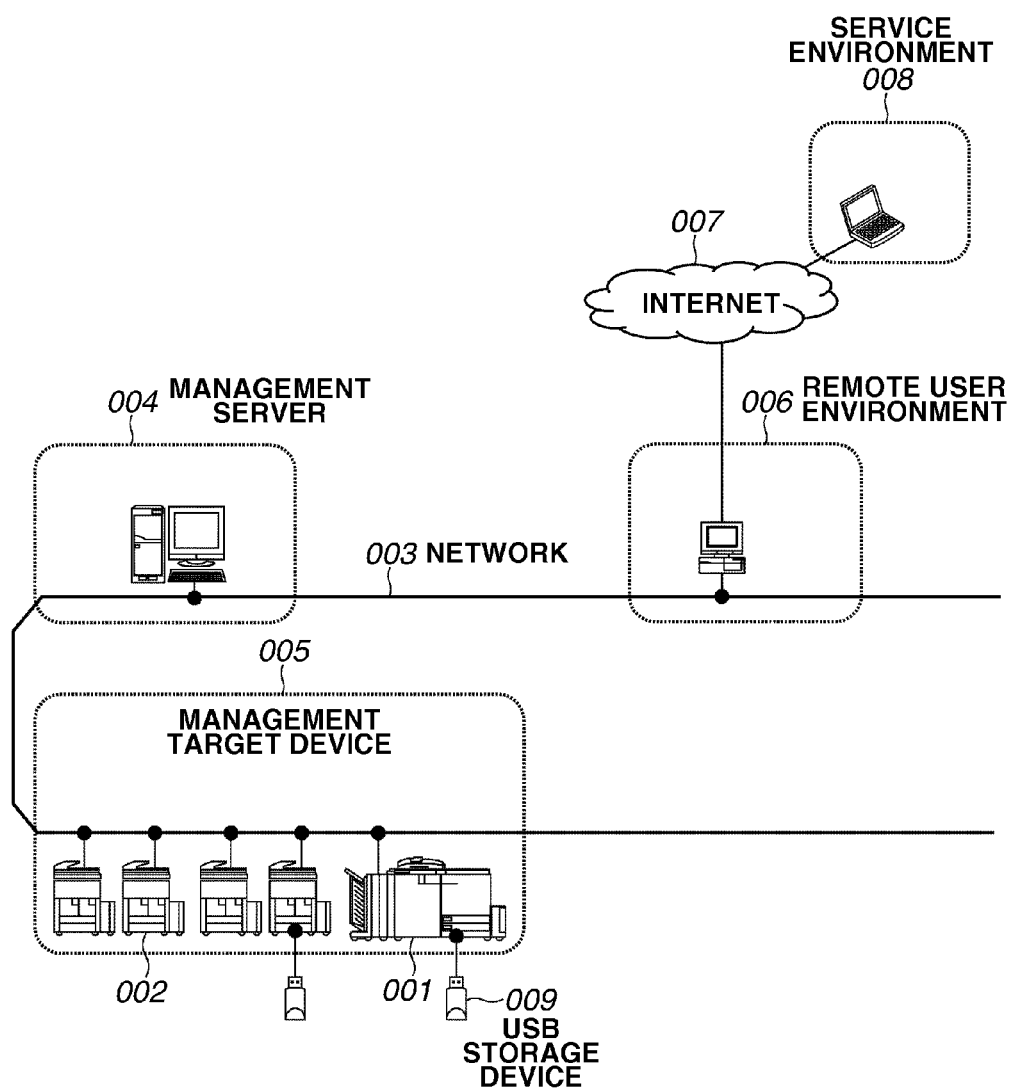
FIG. 1 is a block diagram illustrating an example configuration of a system including an image forming apparatus according to an exemplary embodiment of the present invention.

FIG. 1 illustrates a general system configuration according to an exemplary embodiment of the present invention, which includes at least one image forming apparatus, such as a printing apparatus, a copying machine, or a multifunction peripheral having a plurality of functions. The system illustrated in FIG. 1 includes a copying machine 001 and a copying machine 002, which can read an image of a document, perform image processing on the read document image, and output a copied product. Further, each copying machine serves as a printer that can output page-description language (PDL) data if the data is received via a network 003 from a client computer. On the other hand, image data read by the copying machine 001 can be transmitted to another apparatus, such as a file server or a mail server, via the network 003. In a device group 005, the copying machine 001 and the copying machine 002 are different from each other in device configuration.

A management server 004 is connected to the management target device group 005, which includes the copying machine 001 and the copying machine 002, via the network 003. The management server 004 performs communications for device management, such as export and import setting information. The management server 004 can use a conventionally known protocol, such as Hyper Text Transfer Protocol (HTTP), Simple Object Access Protocol (SOAP), or File Transfer Protocol (FTP), in the communications.

A remote user environment 006 is similar to the management server 004 in functionality. The remote user environment 006 is connected to a remote operation terminal 008 via Internet 007. The remote operation terminal 008 is a terminal dedicated to a remote maintenance service. Thus, the remote operation terminal 008 can communicate with the remote user environment 006 to cause the remote user environment 006 to export setting information of an image forming apparatus included in the management target device group 005. The setting information can be stored and can be imported to another image forming apparatus included in the device group or a newly set image forming apparatus, or to an image forming apparatus in another client environment.

The image forming apparatus can directly export setting information to a universal serial bus (USB) storage device 009, without using the management server 004, in response to a predetermined operation performed on an operation panel. The setting information stored in the USB storage device 009 can be appropriately imported to another image forming apparatus.

Figure 2:
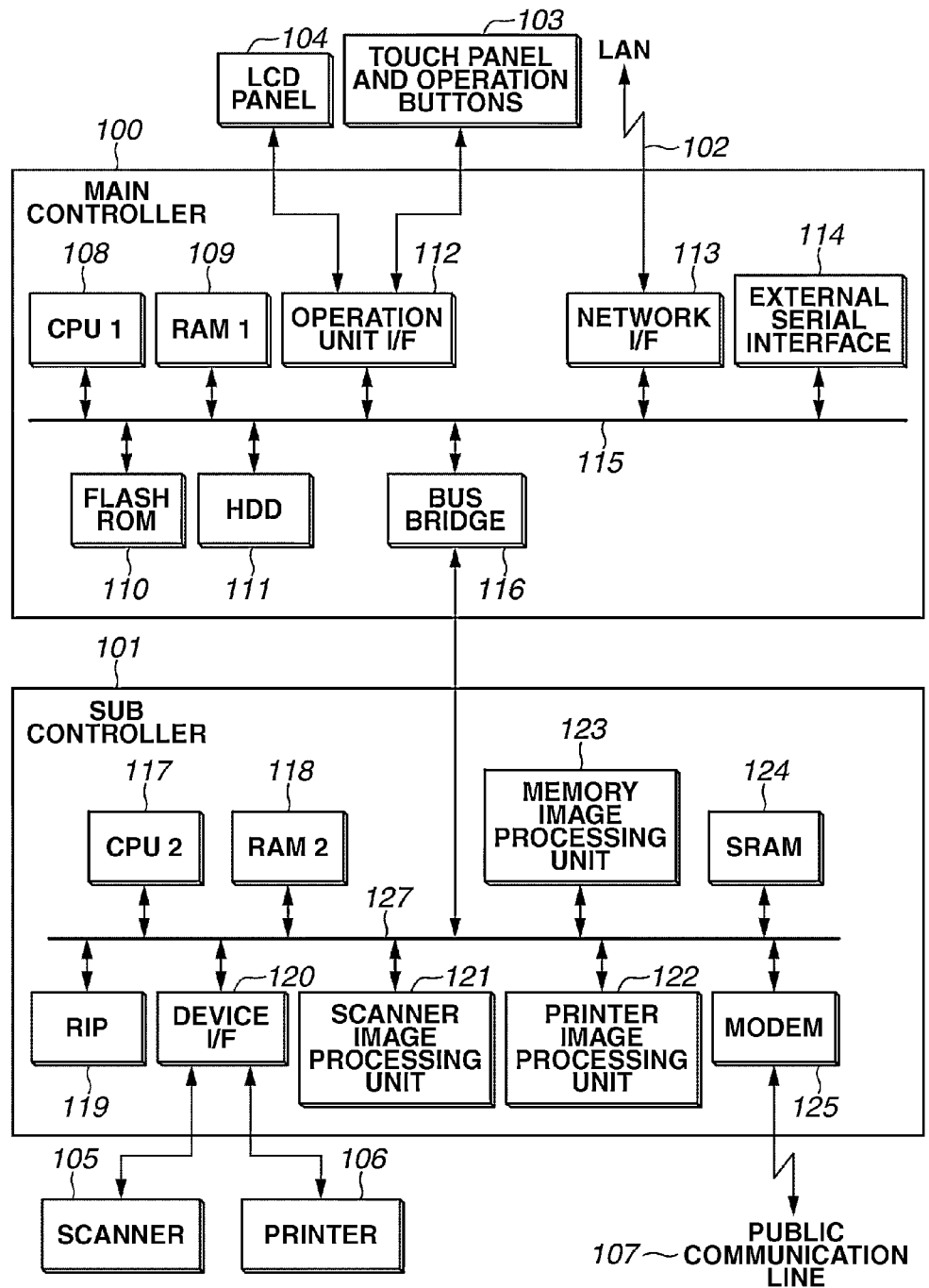
FIG. 2 is a block diagram illustrating a hardware configuration of the image forming apparatus according to an exemplary embodiment of the present invention.

FIG. 2 is a block diagram illustrating a hardware configuration of the image forming apparatus according to the present exemplary embodiment. The image forming apparatus illustrated in FIG. 2 includes a main controller 100 that can serve as an information processing unit of the image forming apparatus. Further, a sub controller 101 can serve as an image processing unit of the image forming apparatus. The main controller 100 includes a bus bridge 116, via which a bus of the main controller 100 is connected to a bus of the sub controller 101. The main controller 100 has the following constituent elements.

The main controller 100 includes a central processing unit (CPU) (1) 108 that can execute software stored in a flash read only memory (FLASH ROM) 110 or in a hard disk drive (HDD) 111. The CPU (1) 108 can control various operations to be performed by respective devices connected to a system bus 115. The FLASH ROM 110 or the HDD 111 is usable as a storage region that can store programs, image data, and user setting data. A random access memory (RAM) (1) 109 is functionally operable as a main memory or a work area for the CPU (1) 108.

An operation unit interface (I/F) 112 can display an image on a liquid crystal display (LCD) panel 104 of the image forming apparatus. Further, the operation unit I/F 112 is connected to a touch panel and/or operation buttons 103. The LCD panel 104 is integrally formed with the touch panel and/or operation buttons 103, to control operator's instructions. A network interface card (NIC) 113 can transmit and receive various data to and from another network device or a file server bidirectionally via a local area network (LAN) 102. An external serial interface 114 is connectable to an external apparatus, such as a memory medium reader or an integrated circuit (IC) card reader, to transmit and receive data bidirectionally.

The sub controller 101 has the following constituent elements. The sub controller 101 is connected to a printing unit (printer) 106, which is capable of performing printing on a paper, for example, according to an electrophotographic method or an inkjet method. Further, the sub controller 101 is connected to an image reading unit (scanner) 105, which is capable of reading an image printed on a paper. In many cases, the image reading unit 105 is equipped with an auto document feeder (not illustrated) as an optional device that can automatically read a plurality of pieces of document content. The sub controller 101 includes a CPU (2) 117, which can transmit and receive a control signal via a device interface 120 to and from each of the printing unit 106 and the image reading unit 105.

The CPU (2) 117 can control various operations to be performed by respective devices connected via a system bus 127. A scanner image processing unit 121 receives an image from the image reading unit 105. The readout image can be temporarily stored in a RAM (2) 118. A memory image processing unit (IMAGEC) 123 can perform processing on an image of the RAM (2) 118 of the image forming apparatus and can output the processed image to the RAM (2) 118. The image processing to be performed by the memory image processing unit 123 includes various (e.g., rotation, zooming, color space conversion, gray scale conversion, combination, coding, and decoding) processing.

After the memory image processing unit 123 completes the image processing on the image loaded on the RAM (2) 118, the CPU (2) 117 transmits the processed image to the storage apparatus 110 or 111 of the main controller 100 via the bus bridge 116. Further, the CPU (2) 117 can read an image from the storage apparatus 110 or 111 of the main controller 100 via the bus bridge 116 and load the read image into the RAM (2) 118. Further, the CPU (2) 117 can output the read image to the printing unit 106 via a printer image processing unit 122.

Processing to be performed by the scanner image processing unit 121 and the printer image processing unit 122 includes various (e.g., color space conversion, movement, color adjustment, density control, and delay amount control) processing. A raster image processor (RIP) 119 can rasterize a PDL code on the RAM (2) 118 into a bitmap image. The RIP 119 can output the rasterized bitmap image to the RAM (2) 118. A static random access memory (SRAM) 124 can speedily input and output nonvolatile data from and to the CPU (2) 117. A modulator/demodulator (MODEM) 125 is connected to a public communication line 107 and can perform modulation/demodulation to input and output FAX images.

Figure 3:
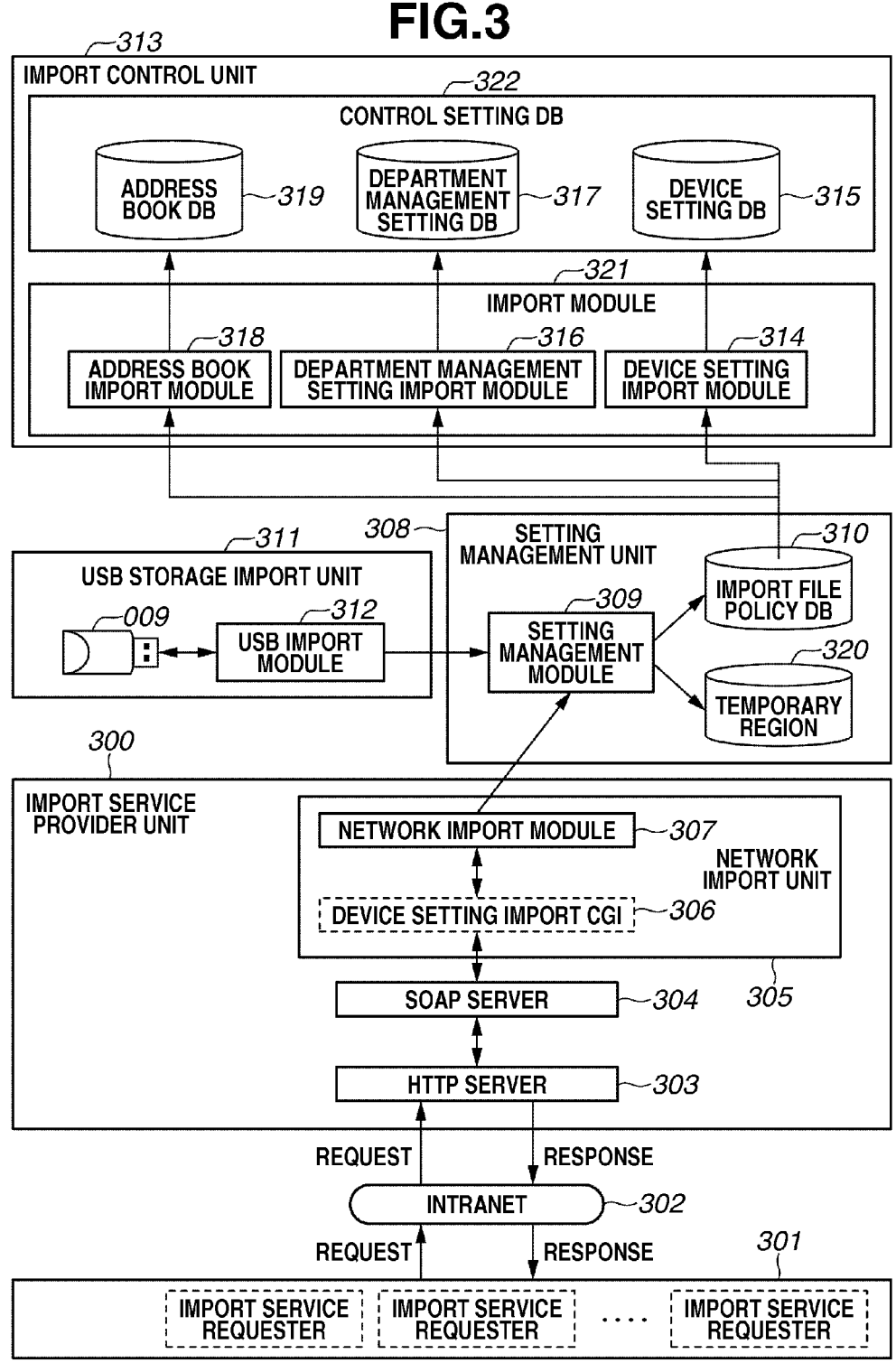
FIG. 3 schematically illustrates an example operation of import processing that can be performed by the image forming apparatus according to an exemplary embodiment of the present invention.

FIG. 3 illustrates a system configuration of an import service that can be installed on the image forming apparatus according to the present exemplary embodiment. Example processing relating to network import service is described below. In the present exemplary embodiment, setting information to be imported includes address book data, department management data, and device setting data. An import service requester 301 can transmit setting information, and an import service provider 300 can receive the setting information.

The import service requester 301 can transmit a Simple Object Access Protocol (SOAP) message via an intranet 302 to communicate with the import service provider 300. A HyperText Transfer Protocol (HTTP) server 303 and a SOAP server 304 can interpret the request message and can launch a Common Gateway Interface (CGI) 306 for the processing that corresponds to the received message. A network import module 307 can process a received request. The SOAP server 304 can launch a device setting import CGI 306 with reference to a service request.

The launched CGI causes the network import module 307 to primarily store a setting file that includes the received setting information in a temporary region 320. Then, the launched CGI waits for a response with respect to secondary storage completion. The setting file has a file format including a plurality of XML data compressed together. After completing the primary storage, the launched CGI requests a setting management unit 308 to perform secondary storage processing.

A setting management module 309 can read compression data from the temporary region 320 and can decompress the readout data. If the decompression processing has been successfully completed, the setting management module 309 initializes an import file policy database (DB) 310. If the initialization processing has been successfully completed, the setting management module 309 starts processing for registering information corresponding to each setting item in the policy DB 310 while parsing XML data obtained after completing the decompression processing.

More specifically, the setting management module 309 acquires device identification information, such as machine body management number (serial number) and model management number (or series number or model code), included in the XML data. If the device identification information acquisition has been successfully completed, the setting management module 309 acquires device identification information of an image forming apparatus that is currently executing an import service and determines a reflection range (i.e., reflection level). If the reflection range of the setting information to be imported is determined, the setting management module 309 stores information relating to the remaining setting items included in the XML data in the policy DB 310.

In the present exemplary embodiment, if there is any setting item that has not been reflected in the policy database, the setting management module 309 registers the non-reflected setting item in a reflection history (not illustrated) to manage the registered information. The setting management module 309 sends a notification together with setting reflection range (i.e., reflection level) to an import control unit 313 having been registered beforehand. The setting management module 309 returns a secondary storage completion response to the import request source.

When an import module group 321 of the import control unit 313 receives a notification from the setting management module 309, the import module group 321 performs tertiary storage of setting information having been received together with the notification so that the setting information can be actually used in the control performed by the image forming apparatus. Each import module is prepared to manage setting information that is unique to a specific function of the image forming apparatus or prepared to manage setting information that is common to a plurality of functions of the apparatus.

These import modules extract a part of the setting information that is finally required in an import file. The extracted setting information is reflected in the image forming apparatus. In the present exemplary embodiment, each of the import modules 318, 316, and 314 acquires a part of the setting information that coincides with the setting item of the processing target from the secondarily stored policy DB 310. The setting information acquired in this case includes setting values and reflection policy. Each import module compares the reflection level notified from the setting management module 309 with the reflection policy. If it is determined that there is setting information to be reflected, each import module registers the setting information to be reflected in a control setting DB 322 so that the import module can be actually used by the image forming apparatus.

In the present exemplary embodiment, the device setting import module 314 reads only the items of the setting information relating to the device setting from the policy DB 310 one by one, and registers the readout setting information to a control device setting DB 315. A department management setting import module 316 reads only the setting information relating to the department management from the policy DB 310 and registers the readout setting information to a control department management setting DB 317. The address book import module 318 reads only the setting information relating to the address book setting from the policy DB 310 and registers the readout setting information to a control address book DB 319.

Next, example processing for importing information from the USB storage is simply described. Like a network import unit 305, a USB storage import unit 311 can perform processing for importing information from the USB storage device 009. A USB import module 312 detects the presence of a setting file in the USB storage device 009. The USB import module 312 stores the setting file in the temporary region 320. Then, the USB import module 312 requests the setting management unit 308 to perform secondary storage processing. The remaining import operation is similar to the network import processing.

Further, each import module acquires meta-information from the secondarily stored policy DB 310, in acquiring setting information corresponding to a setting item to be processed. The import module group 321 performs control relating to the registration method, which is designated by the meta-information, when the setting information is registered to the control setting DB. The control performed by the import module group 321 includes processing relating to encryption, processing for returning the value to the factory shipment value, and processing for prohibiting overwriting the present value.

If the import module group 321 completes the registration of the setting information to be managed to the control setting DB 322, each import module notifies the setting management unit 308 of the completion of the tertiary storage processing. If the completion is notified from all of the import modules to the setting management unit 308, then the setting management unit 308 reboots the image forming apparatus in such a way as to reflect the updated setting values in the next launching processing. The control setting DB 322 according to the present exemplary embodiment is, for example, a static random access memory (SRAM) device, or an HDD device, or a hybrid thereof. The control setting DB 322 is operable speedily and stably. However, the control setting DB 322 is lower in capacity per unit cost and is higher in capacitive constraint.

Figure 4:
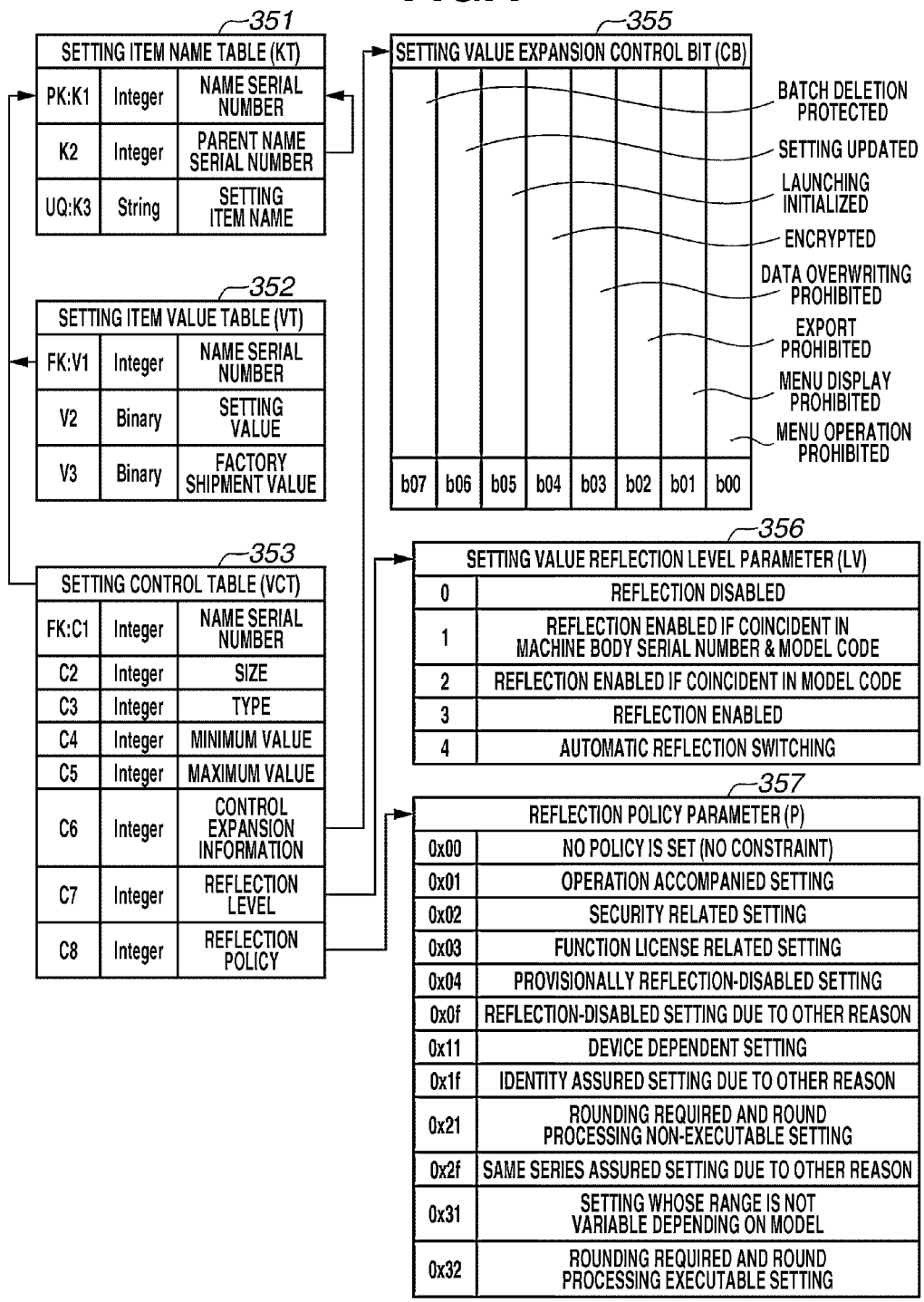
FIG. 4 illustrates a configuration of a policy database that can be used for an input data processing filter.

FIG. 4 illustrates a data structure (format) of setting information that can be managed by the above-mentioned import file policy database (DB) 310. A setting item name table (KeylistTable) 351 includes names of setting items and has a tree structure composed of the entire setting items. A region [K1] is a primary key where a serial number serving as a name item is described, without causing any duplication. A region [K2] is a region where a serial number of a parent name item is described. A region [K3] defines a setting item name expressed using an ASCII character string without causing any duplication.

A setting item value table (ValuelistTable) 352 is a storage place where setting values corresponding to the names of the setting items are stored in a one-to-one relationship. A region [V1] includes the name item [K1] as a foreign key. Accordingly, the setting item value table 352 has a tree structure indirectly. A region [V2] is a region where a setting value acquired from the XML is described in a case where variable length binary data is imported. A region [V3] is a region where a setting value of the variable length binary data is described, similar to the region [V2]. In the present exemplary embodiment, a factory shipment value (i.e., default value) is set in the region [V3].

A setting control table (ValueControlTable) 353 corresponds to the names of the setting items in a one-to-one relationship and includes control information required when the setting value is imported. A region [C1] includes the name item [K1] as a foreign key. Accordingly, the control table has a tree structure indirectly. A region [C2] is a region where an upper-limit size of the setting item is described. A region [C3] is a region where a data type of the setting item is described. A region [C4] regulates a minimum value when the setting value is imported. A region [C5] regulates a maximum value. The maximum and minimum values described in the regions [C4] and [C5] are effective only when the data type defined in the region [C3] is a definition parameter indicating a specific type.

A region [C6] regulates control content in a case where the setting value is registered in a control DB. The value to be set in the region [C6] is described in a setting value expansion control bit (ControlBit) 355. When a bit [b00] is ON, it means that operating a corresponding setting item is prohibited. When a bit [b01] is ON, it means that an operation screen for a corresponding setting item is not displayed. When a bit [b02] is ON, it means that exporting a corresponding setting item is prohibited. When a bit [b03] is ON, it means that rewriting a corresponding setting item is prohibited. When a bit [b04] is ON, it means that a corresponding setting item is a target to be encrypted. When a bit [b05] is ON, it means that initialization (resetting to a default value) is performed upon launching. When a bit [b06] is ON, it means that a corresponding setting item is changed and updated. When a bit [b07] is ON, it means that a corresponding setting item is not a target to be subjected to batch data deletion. When a bit [b07] is OFF, no additional control is performed.

A region [C7] can be used to determine a setting value reflection range in response to an import instruction. The value to be set in the region [C7] is any one of level parameters described in a setting value reflection level parameter (Level) 356. When the setting value reflection level parameter 356 is [0], it means that no setting value is reflected. When the setting value reflection level parameter 356 is [1], it means that the setting value can be reflected if coincidence in both machine body serial number and model code is confirmed between the export processing (by an apparatus from which the setting file is extracted) and the import processing. When the setting value reflection level parameter 356 is [2], it means that the setting value can be reflected if coincidence in model code is confirmed between the export processing and the import processing. In other words, the setting value can be reflected only when the model is identical to model information of the apparatus that has exported the setting information.

When the setting value reflection level parameter 356 is [3], it means that the setting value is constantly reflected. When the setting value reflection level parameter 356 is [4], it means that the determination with respect to the reflection can be automatically selected. The above-described levels can be determined considering the model dependency of each setting item and influences on another setting value that may arise when the setting value is changed.

A region [C8] can be used to record a determination result with respect to reflection of an automatic adjustment (e.g., round processing) of the setting value, or the reason why the setting value has not been reflected, as a code in the log, in response to an import instruction. The value to be set in the region [C8] is any one of policy parameters described in a reflection policy parameter (Policy) 357.

When the reflection policy parameter (Policy) 357 is a parameter [0x00], it means that no policy is set and there is not any constraint. The reflection policy parameter (Policy) 357 includes parameters [0x01] to [0x0f], which can be used additionally to describe the reason of Level 0 (reflection disabled) in a case where the region [C7] is [0]. The reflection policy parameter (Policy) 357 includes parameters [0x11] and [0x1f], which can be used additionally to describe the reason of Level 1 in a case where the region [C7] is [1].

The reflection policy parameter (Policy) 357 further includes parameters [0x21] and [0x2f], which can be used additionally to describe the reason of Level 2 in a case where the region [C7] is [2]. Moreover, the reflection policy parameter (Policy) 357 includes parameters [0x31] and [0x32], which can be used additionally to describe the reason of Level 3 in a case where the region [C7] is [3].

The parameter [0x31] indicates that the value range can be directly reflected when the value range to be set is not variable depending on the model. On the other hand, the parameter [0x32] indicates that an adjusted result (e.g., round processing result) of the value range that corresponds to the model is reflected when the value range to be set is variable depending on the model.

Figure 5B:
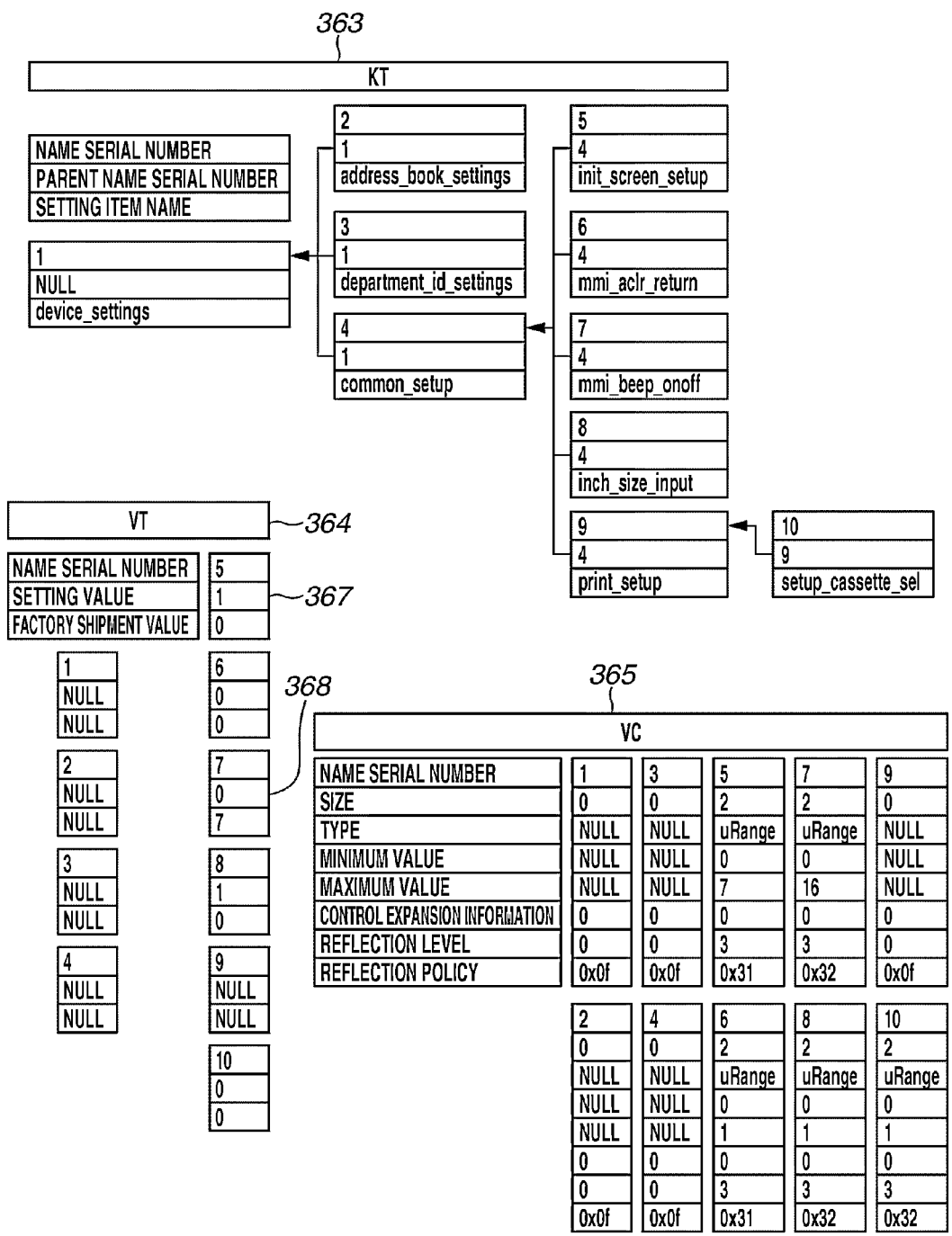

FIGS. 5A and 5B illustrate a detailed configuration of the data that can be managed by the tree structure of the policy database 310. FIGS. 5A and 5B also illustrate setting information partly extracted from the items (address book item, department management setting item, and device setting item) illustrated in FIG. 3.

The setting information has a tree structure that represents a parent-child relationship, as illustrated in a conceptual diagram 361. More specifically, the setting information is classified into three categories (i.e., major item, medium item, and minor item), accompanied by a practical value attached to a terminal node. When the setting information is exported, the setting information is changed into XML format data 362 from the internally used data structure. Further, to import the XML data, the policy database 310 forms a table 363 that includes setting information having a tree structure according to the format illustrated in FIG. 4.

More specifically, as illustrated in the table 363, the processing according to the present exemplary embodiment includes constructing a tree structure by connecting records in the setting item name table with reference to the setting items included in the XML data. Next, as illustrated in a table 364, the processing includes preparing a plurality of setting value records in such a way as to correspond to respective setting item name records, so that imported setting values can be stored.

Further, as illustrated in a table 365, the processing includes preparing setting control records (that can control reflection of the setting value) in such a way as to correspond to respective setting item name records, and setting a policy for each record beforehand.

According to the illustrated example of the import, the XML data 362 includes a setting (mmi_scrn_svr_onoff) 366 relating to a screen saver, which indicates that there is not any setting target in an import target (e.g., image forming apparatus). Therefore, in the secondary storage of the policy database 310, no record is prepared (namely, disregarded) in the table 363. Further, the value of a record 367 that indicates a setting value of an initial function setting (init_screen_setup) is updated from the default value [0] to [1]. Further, the value of a record 368 that indicates a setting value of a buzzer ON/OFF setting (mmi_beep_onoff) is updated from the default value [7] to [0].

FIG. 6 illustrates an example of an operation unit in a state where setting values are imported via the policy database and actually reflected. More specifically, the display illustrated in FIG. 6 corresponds to the settings in an enclosed area of the conceptual diagram 361. According to the example illustrated in FIG. 6, an updated result [copy] is displayed in the field of an item "initial function setting" on the screen in response to an update of the initial function setting (init_screen_setup) from "top menu" [0] to "copy" [1]. Further, an updated result [OFF] is displayed in the field of an item "buzzer ON/OFF" on the screen in response to an update of the buzzer ON/OFF setting (mmi_beep_onoff) from "volume=medium" [7] to "OFF" [0].

Figure 7:
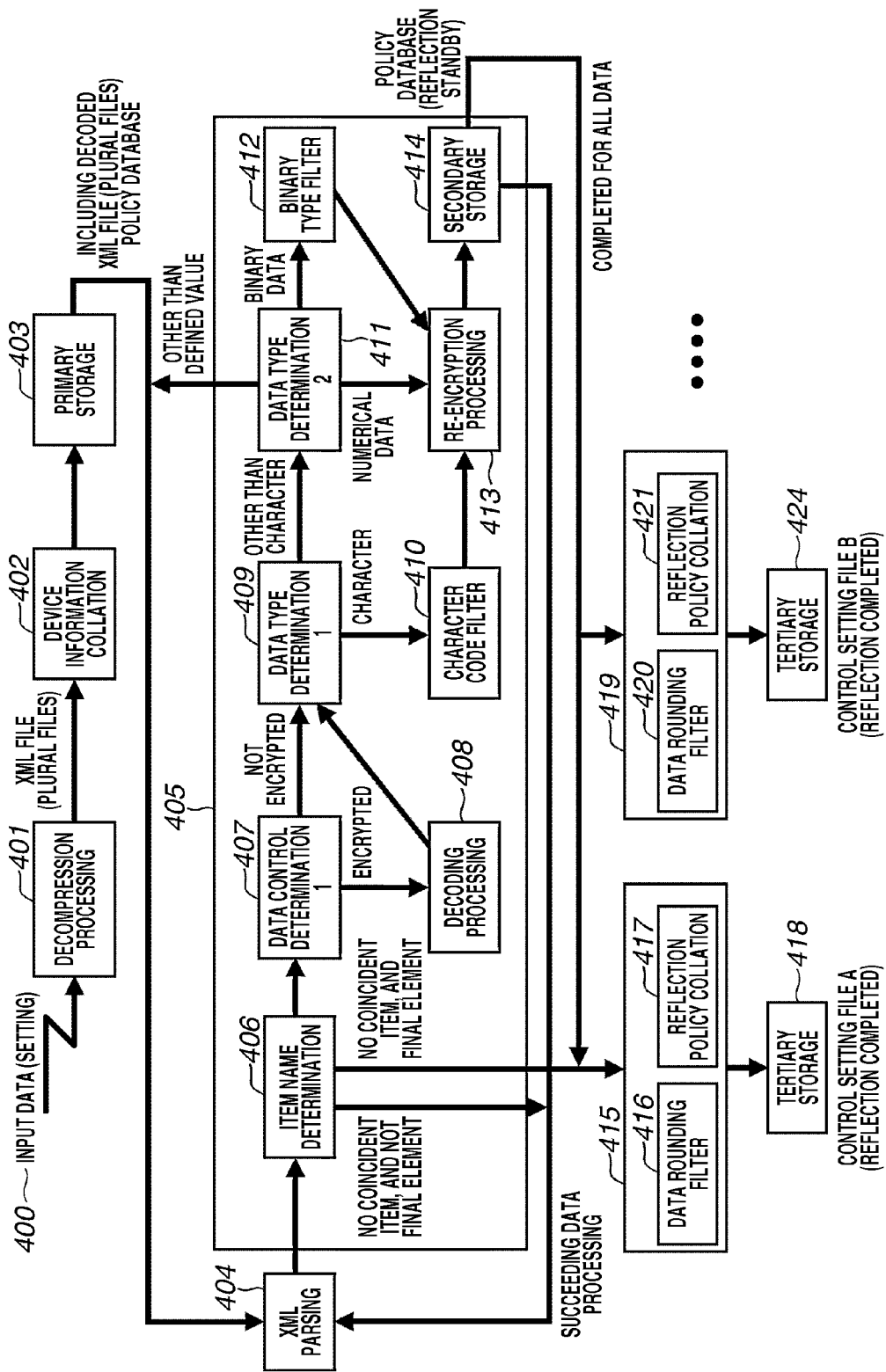
FIG. 7 is a data flow illustrating detailed processing that can be performed when setting values are imported according to an exemplary embodiment of the present invention.

FIG. 7 is a data flow illustrating detailed processing that can be performed by the filter processing unit according to the present exemplary embodiment. In FIG. 7, input data 400 is a compression data file that includes a plurality of XML files, which is stored in the above-mentioned temporary region 320. In the present exemplary embodiment, the compression file can include a policy database 405.

The setting management module 309 reads the compression file from the temporary region 320 and performs decompression processing (see 401). After completing the decompression processing, the setting management module 309 parses the obtained XML data and acquires device identification information, such as machine body management number (serial number) and model management number (series number), included in the XML data.

Next, the setting management module 309 acquires device identification information of the presently executed machine body and determines a reflection range (i.e., reflection level) (see 402). After determining the setting reflection range, the setting management module 309 primarily stores the XML files in the temporary region 320 (see c403).

After extracting all of the XML files, the setting management module 309 starts parsing all items of the XML files (see 404) and registers the parsed data in the policy database 405. In other words, the setting management module 309 performs secondary storage processing according to the present exemplary embodiment of the present invention.

The setting management module 309 extracts some elements, such as setting item name, item size, item type, and item value, from the XML files. Next, the setting management module 309 searches the policy database 310 to determine whether the extracted elements are coincident with the information described in the item name 351 [K3], the item size 353 [C2], and the item type 353 [C3] (see 406).

If there is not any coincident element in the policy database 310 with respect to setting item name (or type or size), the setting management module 309 does not reflect the value and continues to parse the next element (see 404). If the processed element is the final element, the setting management module 309 determines that the reflection of all elements has been completed. Then, the processing proceeds to a setting value reflection phase.

On the other hand, if there is an element that is coincident in item, size, and type in the policy database 310, the setting management module 309 searches the setting control table 353 to find a record that has a name serial number [C1] that is identical to the record number of the coincident name serial number [K1]. The setting management module 309 acquires the setting values of the type information 353 [C3] and the control expansion information 353 [C6] from the setting control table 353.

First, the setting management module 309 determines whether a value setting item is the encrypted data (see 355) with reference to the information described in the control expansion information 353 [C6] (see 407). If it is determined that the value setting item is the encrypted data, the setting management module 309 performs decoding processing (see 408) to obtain text data converted from the encrypted data and subsequently performs data type determination processing (see 409). On the other hand, if it is determined that the value setting item is not the encrypted data, the setting management module 309 directly performs the data type determination processing (see 409).

More specifically, the setting management module 309 determines whether the type of the setting item is character string (354) with reference to the corresponding record type information 353 [C3] (see 409). If it is determined that the type of the setting item is character string data, the setting management module 309 performs character code conversion processing (see 410) to convert the item value into a character string of character code UTF-8. Then, the setting management module 309 performs re-encryption processing (see 413).

On the other hand, if it is determined that the type of the setting item is not the character string data, the setting management module 309 performs data type determination (see 411). More specifically, the setting management module 309 determines whether the type of the setting item is numerical data (354) with reference to the corresponding record type information 353 [C3]. If it is determined that the type of the setting item is the numerical data, the setting management module 309 performs the re-encryption processing (see 413) to register the item value as a numerical value without performing any conversion processing.

On the other hand, if it is determined that the type of the setting item is binary data (not the numerical data), the setting management module 309 performs binary data conversion processing (see 412). If the type is not included in the range of the type definition parameter 354, or when no corresponding type definition is present, the setting management module 309 does not reflect the value and continues to parse the next element (see 404).

If it is determined that the corresponding record is binary data, the setting management module 309 performs binary data conversion processing (see 412) to convert the dumped character string data into binary data and performs the re-encryption processing (see 413) to register the item value as binary data In the re-encryption processing (see 413), the setting management module 309 re-encrypts the registration target data if the target is an encryption target item with reference to the result of the determination (see 407) in which the setting management module 309 determines whether the setting item is the encrypted data. Subsequently, the setting management module 309 performs secondary storage processing (see 414). If it is determined that the target is not the encryption target item, the setting management module 309 performs the secondary storage processing (see 414) without performing the re-encryption processing.

Next, the setting management module 309 searches the setting item value table 352 to find a record that has a name serial number [V1] that is identical to the record number of the coincident name serial number 351 [K1]. Then, the setting management module 309 records the acquired data as the setting value [V2] of the setting item value table 352 (see 414). Then, the setting management module 309 continues to parse the next element (see 404). If the above-described processing is completed for all items of the XML files, the setting management module 309 completes the secondary storage processing (see 405).

Next, the setting management module 309 sends a request of tertiary storage processing, together with the reflection range (i.e., reflection level), to each import module 321. Each import module 321 (referred to as (415) and (419) in FIG. 7) receives the request. In response to the request, each import module 321 solves a name serial number 351 [K1] that coincides with the setting item name 351 [K3] of the policy database 310 with a key of a plurality of setting item names, which are processing targets relating to the import module.

Next, each import module 321 solves a name serial number 352 [V1] of the policy database 310 that coincides with the obtained name serial number 351 [K1] and acquires a corresponding setting item value record 352. Next, each import module 321 solves a name serial number 353 [C1] that coincides with the name serial number 351[K1] of the policy database 310 and acquires a corresponding setting item control record 353.

Next, each import module 321 refers to values of the reflection level 353 [C7] and the reflection policy 353 [C8] with reference to the setting item control record 353. Each import module 321 compares the reflection range (i.e., reflection level) requested by the setting management module 309 with the reflection level 353 [C7] (see 417 and 421). If the requested reflection range (i.e., reflection level) is equal to or less than the reflection level 353 [C7], each import module 321 tertiarily stores the data in a setting management database that can be used for various controls (see 418 and 424).

If the reflection range (i.e., reflection level) requested by the setting management module 309 and the reflection level 353 [C7] are both "reflection enabled" 356 [3], each import module 321 determines whether the value of the reflection policy 353 [C8] is "rounding required" 357 [0x32]. If the rounding is required, each import module 321 converts the data using a data rounding filter 416 or 420 provided in the import module and tertiarily stores the converted data in the control setting DB 322 (see 418 and 424). If each import module 321 completes the tertiary storage processing, the imported data are entirely brought into a setting completed state in compliance with the policy database. Thus, the imported data can be used for various control operations.

Figure 8:
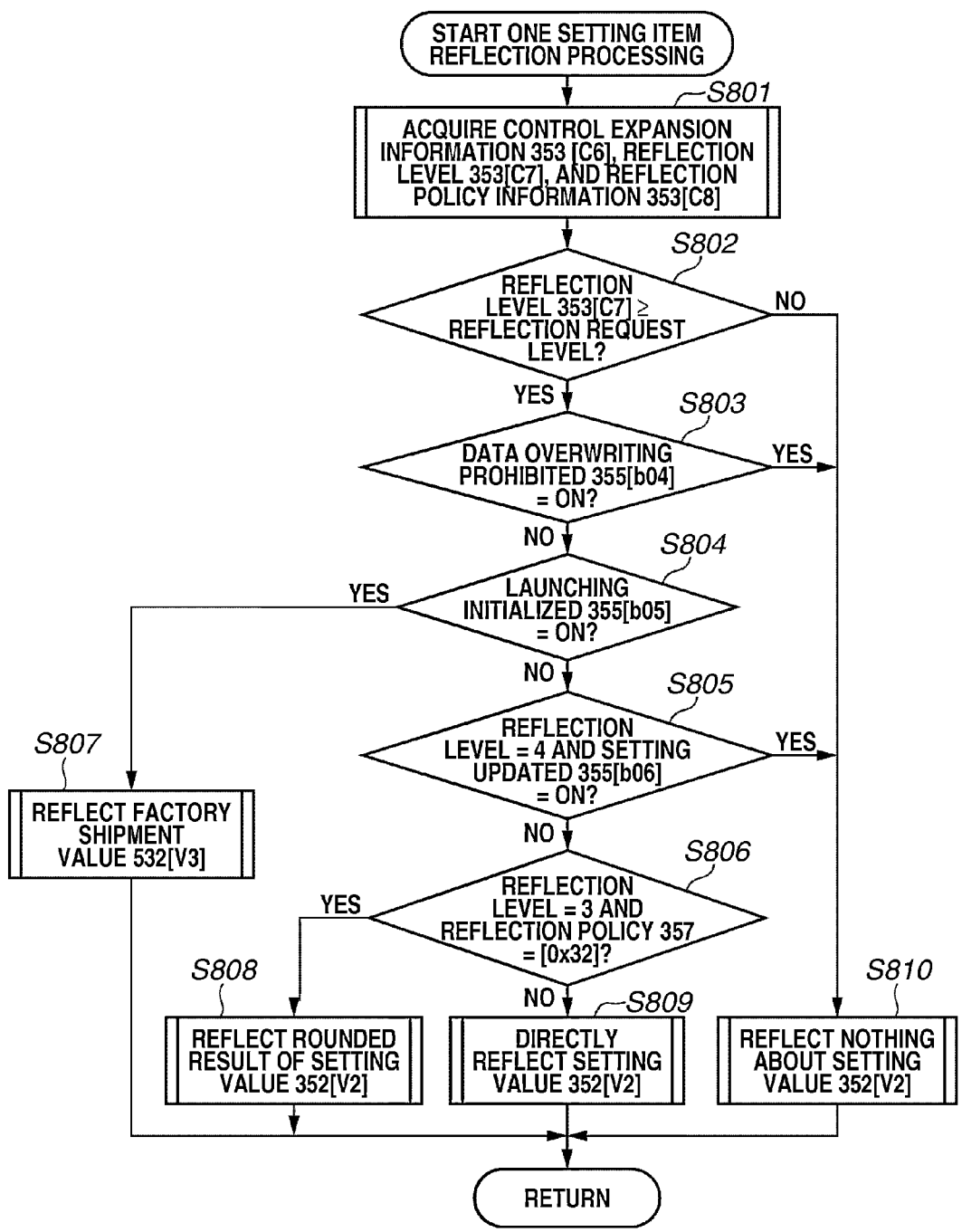
FIG. 8 is a flowchart illustrating an example of reflection processing that can be performed when setting values are imported.

FIG. 8 is a flowchart illustrating an example of one setting item reflection processing, which can be performed in a case where each import module 321 tertiarily stores the secondarily stored data, according to the present exemplary embodiment. As described above, each import module 321 uses setting item names to manage the target item to be tertiarily stored and the storage destination.

First, in step S801, each import module 321 acquires the control expansion information 353 [C6], the reflection level 353 [C7], and the reflection policy information 353 [C8] of a target setting item to determine whether to reflect the target setting item.

Next, in step S802, each import module 321 compares a reflection request level received from the setting management module 309 with the received reflection level 353 [C7]. If the reflection request level is equal to or greater than the reflection level (YES in step S802), each import module 321 designates the setting item as a reflection candidate. Then, the processing proceeds to step S803. On the other hand, if the reflection request level is less than the reflection level (NO in step S802), each import module 321 does not reflect the setting item. Then, the processing proceeds to step S810.

Next, in step S803, each import module 321 determines whether the value of the "data overwriting prohibited" 355 [b03] of the control expansion information 353 [C6] is ON. If the "data overwriting prohibited" 355 [b03] is OFF (NO in step S803), each import module 321 designates the setting item as a reflection candidate. Then, the processing proceeds to step S804. On the other hand, if the "data overwriting prohibited" 355 [b03] is ON (YES in step S803), each import module 321 does not reflect the setting item. Then, the processing proceeds to step S810.

Next, in step S804, each import module 321 determines the value of the "launching initialized" 355 [b05] of the control expansion information 353 [C6] is ON. If the "launching initialized" 355 [b05] is OFF (NO in step S804), each import module 321 designates the setting item as a reflection candidate. Then, the processing proceeds to step S805. On the other hand, if the "launching initialized" 355 [b05] is ON (YES in step S804), the processing proceeds to step S807. In step S807, each import module 321 reflects the factory shipment value.

Next, in step S805, each import module 321 determines whether the reflection level 353 [C7] is [4] and the value of the "setting updated" 355[b06] of the control expansion information 353 [C6] is ON. If the reflection level is not "automatic" or the "setting updated" is OFF (NO in step S805), each import module 321 designates the setting item as a reflection candidate. Then, the processing proceeds to step S806. On the other hand, if the reflection level is "automatic" and the "setting updated" is ON (YES in step S805), each import module 321 does not reflect the setting item. Then, the processing proceeds to step S810.

Next, in step S806, each import module 321 determines whether the reflection level 353 [C7] is [3] and the reflection policy 353 [C8] requires rounding (0x32). If the reflection level is not [3] or the reflection policy does not require the rounding (see 0x31), the processing proceeds to step S809. In step S809, each import module 321 reflects the setting value directly (without any conversion). On the other hand, if the reflection level is [3] and the reflection policy requires the rounding (see 0x32), the processing proceeds to step S808. In step S808, each import module 321 reflects a rounded result of the setting value.

Finally, each import module 321 registers the factory shipment value reflected in step S807, the rounding processed setting value reflected in step S808, or the setting value directly reflected in step S809 in the control setting DB 322. On the other hand, in step S810, each import module 321 reflects nothing about the setting value.

As described above, the system according to the present exemplary embodiment can manage and change the policy that determines whether to reflect each setting item in a batch manner for each image forming apparatus that has numerous different setting items. Further, the system according to the present exemplary embodiment can reflect setting data exported from a specific machine body for numerous image forming apparatuses that are different in configuration safely and as much as possible. Thus, the system according to the present exemplary embodiment can reduce the costs to be required in the management of setting values.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-095179 filed Apr. 21, 2011, which is hereby incorporated by reference herein in its entirety.

What is claimed is:

1. An image forming apparatus that performs control according to setting information including unique settings for each apparatus and common settings commonly usable for a plurality of apparatuses including the image forming apparatus, the image forming apparatus comprising:
 a first storing unit configured to store, in a temporary region, setting information that is received from a connected device;
 a determination unit configured to compare device identification information acquired from the setting information stored in the temporary region with device identification information of the image forming apparatus, and to determine a reflection level indicating a reflection condition used in reflecting each setting included in the setting information stored in the temporary region, wherein the device identification information includes at least one of serial number and model code;
 a second storing unit configured to store the setting information in a first database different from the temporary region after the determination of the reflection level;
 an extraction unit configured to extract a setting to be reflected according to the reflection level from the setting information stored in the first database, using a plurality of import modules prepared for each of the unique settings and the common settings included in the setting information; and
 a third storing unit configured to store the extracted setting in a second database that is actually used for control performed by the image forming apparatus,
 wherein the third storing unit is configured to obtain a value compliant with a reflection policy indicating information about a constraint corresponding to the reflection condition for the setting extracted according to the reflection level using the plurality of import modules, and to store the obtained value in the second database.

2. The image forming apparatus according to claim 1, wherein the common settings include address book information.

3. The image forming apparatus according to claim 1, wherein the connected device includes a universal serial bus (USB) storage device.

4. The image forming apparatus according to claim 1, further comprising a management unit configured to manage, as history information, a setting that is not reflected according to the reflection level and a reason why the setting is not reflected.

5. A method for an image forming apparatus that performs control according to setting information including apparatus unique settings for each apparatus and common settings commonly usable for a plurality of apparatuses including the image forming apparatus, the method comprising:
 storing, in a temporary region, setting information, that is received from a connected device;
 comparing device identification information acquired from the setting information stored in the temporary region with device identification information of the image forming apparatus, and determining a reflection level indicating a reflection condition used in reflecting each setting included in the setting information stored in the temporary region, wherein the device identification information includes at least one of serial number and model code;

storing the setting information in a first database different from the temporary region after determining the reflection level;

extracting a setting to be reflected according to the reflection level from the setting information stored in the first database, using a plurality of import modules prepared for each of the unique settings and the common settings included in the setting information;

storing the extracted setting in a second database that is actually used for control performed by the image forming apparatus; and obtaining a value compliant with a reflection policy indicating information about a constraint corresponding to the reflection condition for the setting extracted according to the reflection level using the plurality of import modules, and storing the obtained value in the second database.

6. A non-transitory computer-readable storage medium storing a computer program that causes a computer to execute a method for an image forming apparatus configured to perform control according to setting information, which includes apparatus unique settings for each apparatus and common settings commonly usable for a plurality of apparatuses including the image forming apparatus, the method comprising:

storing, in a temporary region, setting information, that is received from a connected device;

comparing device identification information acquired from the setting information stored in the temporary region with device identification information of the image forming apparatus, and determining a reflection level indicating a reflection condition used in reflecting each setting included in the setting information stored in the temporary region, wherein the device identification information includes at least one of serial number and model code;

storing the setting information in a first database different from the temporary region after determining the reflection level;

extracting a setting to be reflected according to the reflection level from the setting information stored in the first database, using a plurality of import modules prepared for each of the unique settings and the common settings included in the setting information;

storing the extracted setting in a second database that is actually used for control performed by the image forming apparatus; and obtaining a value compliant with a reflection policy indicating information about a constraint corresponding to the reflection condition for the setting extracted according to the reflection level using the plurality of import modules, and storing the obtained value in the second database.

7. The image forming apparatus according to claim 1, wherein the setting information is described in Extensible Markup Language (XML).

* * * * *